United States Patent Office 2,999,658
Patented Sept. 12, 1961

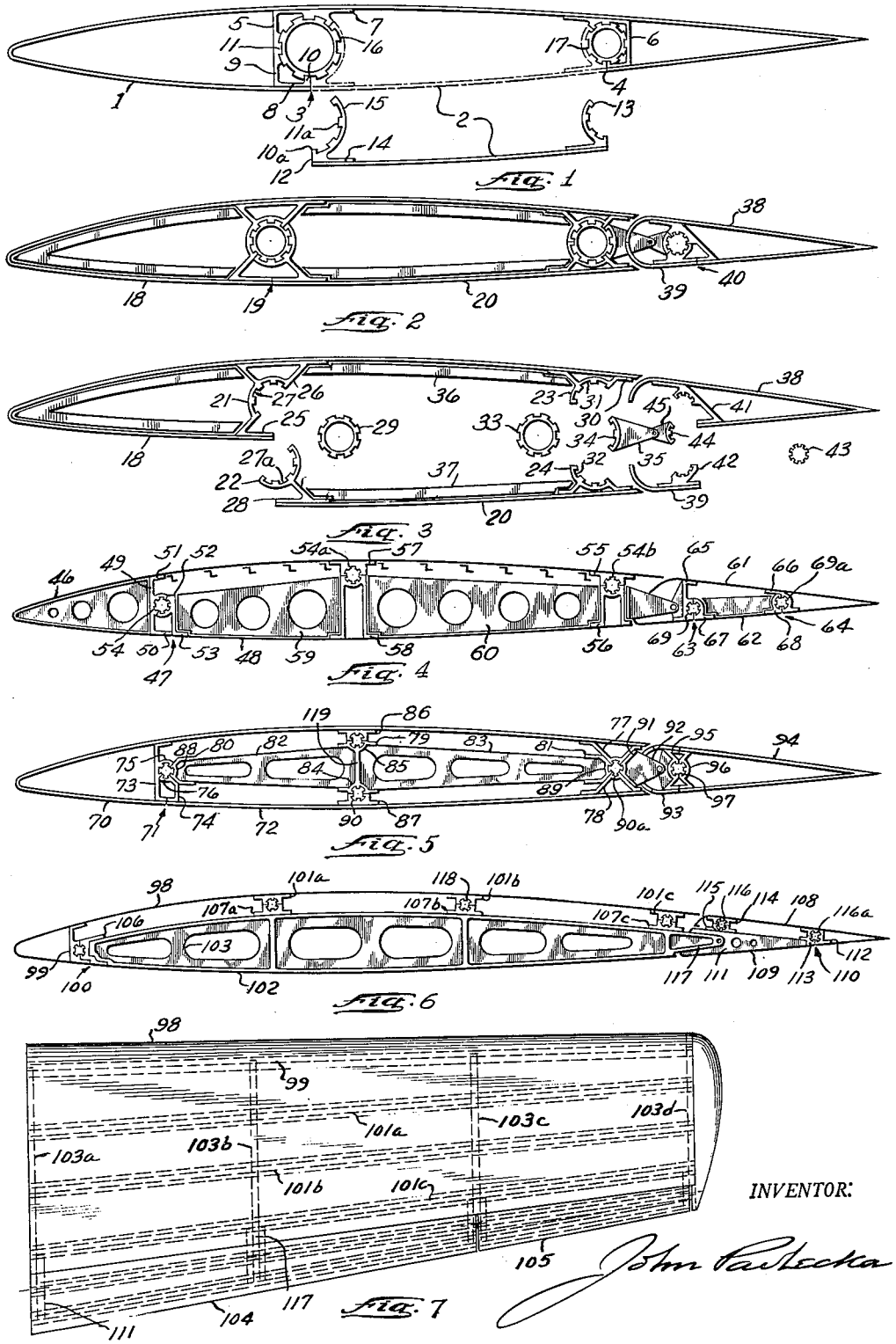

2,999,658
AIRFOIL STRUCTURE
John Pavlecka, 8797 Capital, Oak Park, Mich.
Filed July 16, 1958, Ser. No. 749,005
25 Claims. (Cl. 244—124)

This invention relates to a novel type of structure for hollow bodies which consist of an elongated shell and of internal supporting members, such as containers for liquids, columns, ship rudders, etc., and is particularly useful for airfoil bodies of all kinds, such as airplane and missile wings, helicopter rotor blades, and movable control surfaces.

This is a continuation-in-part of my application for Interlocked Panel Structure, Serial No. 295,997, filed June 27, 1952, and is related to the subject matter of my applications for Airfoil Structure, Serial Nos. 706,229 and 708,339, filed December 26, 1957 and January 9, 1958, respectively, and Serial No. 10,827, filed January 12, 1960.

The objects and the novel results accomplished through this invention include a structure for airfoil and like bodies which is distinguished by an aerodynamically clean surface and true contour because, among other reasons, it requires at the most only two seams or parting lines, and in most wings or portions thereof only one, and such parting lines or line are located remotely from the air penetrating chordal extremity of the wing.

Another object is a shell structure which is divided into two panel units both of which, as well as interjacent stress members when any are used, are producible with full accessibility and thus do away with "blind" riveting and, moreover, may do away with riveting entirely as an inferior process from the standpoints of surface quality, strength, cost, and weight; instead, such processes as seam or spot welding and adhesive bonding can be applied extensively, thereby converting aircraft fabrication from piece-by-piece handiwork of skilled craftsman into a series of production operations.

A further object resides in devising an internally supported and demountably assembled structure suitable particularly for airfoil bodies, in which the usual multitude of rivets holding parts together permanently is eliminated, and instead the structure is assembled from completed sub-assemblies or panel units, and in certain embodiments also from a framework of stress members as another sub-assembly, by an interlocked engagement of linear mortised keys telescoped into the sub-assemblies from one lengthwise or spanwise end of the structure, and the structure can equally readily be disassembled for inspection, repair or replacement of any of its sub-assemblies or components thereof.

Yet another object is an airfoil or analogous structure which is integrated from completed sub-assemblies, the subassemblies including supporting stress members which function also as carriers of key-engaging tenoned sockets, and are locked together relatively immovably by slidably inserted mortised keys, the interlocked stress members and the keys functioning jointly as unitary stress members or spars in the structure.

Another object is to devise a relatively immovable and cohesive union between separable portions of a shell structure by providing a spar intervening between the opposite sides of one of the portions at and along a parting line between the portions, and providing a stringer on the other portion in juxtaposition to the spar at a transverse dividing plane, and providing longitudinally tenoned segmental sockets on both the spar and the stringer for engaging a linear mortised key and thereby causing the stringer to complement the spar as a unitary stress member.

A still further object is a key-locked union for the opposite sides of a shell, such as in an airplane wing, with each other as well as with one or two spars which extend interjacent the shell sides, one of the spars carrying hinge brackets for an aileron or flap and the other one being part of a framework or sub-assembly of stress members, the union being effected by including such a spar or spars laterally between opposed stringers on the shell sides, and the stringers together with the spar or spars engaging jointly and complementally a linear mortised key.

A comprehensive object of this invention is a shell structure of an elongated or airfoil profile wherein two panel units constitute the shell and meet either at one or two lengthwise parting lines remote from the shell profile extremities, the panel units being provided with integral stress members at and along each parting line and at a location apart from one such parting line, and the stress members at each location are interlocked by a linear mortised key to provide principal stress members for the shell; the key at one of the locations may interlock also a spar on which an aileron or flap is mounted pivotally; in large embodiments, a framework of stress members is provided between the locations of the principal stress members, such framework being interlocked by keys with either one or both of the panel units at intervals intermediate the principal members, and being interlocked with the principal members by the keys therein.

The manner of accomplishing the above objects and results, and others, is disclosed in the following paragraphs first with reference to all the embodiments shown in the drawing which forms an integral part of this specification, and then in a detailed description of each one of them.

The airfoil or like shell structure of my invention includes normally only two panels or panel units, one of which provides one whole side of the shell or at least its surface at the location of its maximum camber and between that location and one of its closed chordal or profile extremities, and is continuous around that extremity, or around both such extremities, to the other shell side and meets the other panel unit in coplanar continuity at a lengthwise or spanwise parting line or lines distanced from the closed extremity or extremities; the other panel unit forms a complement of the first one between the shell parting lines, or from one parting line to an open chordal extremity.

Supporting and bracing members in the shell of the above configuration include spanwise members integral with the panel units—hereinfurther referred to as "principal" members—and located at and along the two parting lines therein, or at and along one parting line and at and along an open aft chordal extremity of the shell; in certain embodiments additional spanwise stress members or spars, either integral with one of the panel units or as a separate sub-assembly are provided intermediate the principal ones, and others may be provided as chordal bulkheads or ribs between any or all such spanwise members to form a unitary framework therewith; all of the spanwise stress members are assigned the additional function as the carriers of means for locking themselves and the shell panel units together rigidly yet separably by engaging slidably linear mortised keys which also participate in stress resisting duty.

The principal stress members at and along each shell parting line consist of a spar which intervenes between and is attached to the opposite inner sides of the panel unit which forms a closed chordal extremity of the shell; extending in juxtaposition or side-by-side to the spar is a stringer which is a part of the other panel unit; both the spar and the stringer carry coaxially alined longitudinal segmental sockets with tenons running lengthwise on them; into both sockets so alined is telescoped a linear key which has a lengthwise mortised periphery, and which interfits with the socket tenons slidably and engages them relatively immovably in the angular direction; the spar and the stringer so interlocked, besides holding the panel units together as portions of the shell, complement each other and coact as a single stress member for the support of the shell; moreover, by having the dividing plane between the sockets thereof lie in a direction generally transverse to the shell, i.e., either normal or diagonal to it, the spar and the stringer can induce maximum cohesion of the shell panel units at their parting line and thus hold them effectively in edge-to-edge continuity thereat.

In airfoil structures where the aft profile extremity is occupied by a movable complemental body such as an aileron, flap, or air brake, and the panel units meet at only one parting line proximate to the fore chordal extremity and form an open aft extremity, the principal stress members at the open extremity include two stringers extending on the panel units in oposition to each other, and both such stringers carry on them coaxially alined and lengthwise tenoned sockets analogous to those on the fore spar and stringer, and are interlocked by a mortised key in the same manner and function as a unitary stress member equivalent to a spar.

In certain airfoil structures the above disclosed stress members in their interlocked relationship are adequate to resist all stresses, and in others additional members for that purpose may be needed; these may be provided in the form of one or more pairs of opposedly alined spanwise stringers on the panel units, located intermediate the principal ones, and carrying segmental sockets in a mortise-and-tenon slidable engagement with a mortised linear key; for bracing the panel units and transferring shear loads and skin loads on them to and into the stringers and into the spar or spars, chordal members in the form of ribs or bulkheads are provided, and may extend either in sections between the sides of concurrent stringers and spars, or may run clear across one or both of the panel units and carry the stringers on their flanges.

For large airfoils, one or more of individual spars may be employed interjacent the panel units apart from the spar-and-stringer union at their parting line or lines, such spar or spars being in opposed alinement with stringers provided on the panel units and in cojoint engagement of mortised linear keys with them by means of tenoned sockets; furthermore, chordal bulkheads or ribs attached to the spar or spars and therefrom projecting fore and aft towards the principal spar-and stringer union or towards the union of the opposed stringers, may be provided so that they constitute, jointly with the intermediate spar or spars, a unitary framework of stress members; such a framework may be made an integral part of one of the panel units, or, it may constitute a separate sub-assembly, in which case lateral spars are secured to the termini of the bulkheads and by means of segmental tenoned sockets on them are coaxially alined with the sockets on the principal spar and stringer at one profile extremity, and with the opposed stringers at the other extremity, and are locked into unity with them by the same keys that hold them together.

The objective of facile assembly and disassembly of the panel units, and of the separate framework, if any is used, is fulfilled by first securing the separate framework to one of the panel units, whereupon both panel units are brought into contact and continuity with each other at their parting line or lines in the face-to-face direction, thereby bringing all the associated sockets on them into coaxial alinement with one another; when interlocked by the keys, all the components of the panel units and of the framework, if used, as well as the keys themselves, cooperate in stress resisting because of their particular location and association as disclosed, and because of their relatively immovable interlock by the mortised keys.

In an airfoil divided into two relatively movable bodies, such as a wing and an aileron, both can be attached to each other by similar components in each one of them; these include a longitudinal segmental tenoned socket of either a limited length or of a length capable of functioning as a spar, and of hinge brackets or hinges attached at intervals to it; such a socket or spar is alined coaxially with angularly parted segmental sockets of two stringers and key-locked with each other at one chordal extremity of such a body, and is locked into unity with them by the same key that locks them together; the brackets or hinges on such a spar are connected pivotally to brackets or hinges in the other body, preferably pertaining to a like socket or spar integrated in a like manner into that body.

The structural principles of my invention above disclosed are all represented in the several exemplary embodiments in the drawing, in which:

FIG. 1 shows a profile view of a structure such as an airplane wing, helicopter rotor blade, control surface, etc., in which two panel units form a shell and are parted on one side of it distantly from its chordal ends; spars and stringers forming parts of the respective panel units hold them together rigidly by cojoint dovetail engagement with two linear mortised keys; one of the panel units is shown separately in solid lines as well as in dot-and-dash lines in its assembled position.

FIG. 2 is a profile view of an airplane wing comprising two panel units having a spar and stringers as their components, in a mortise-and-tenon slidable engagement of linear keys; an aileron or flap of analogous construction is hinged to the wing by brackets carried on individual sockets, or on a spar included in the key-locked unions in the wing and in the aileron.

FIG. 3 is an exploded view of the components of the structure of FIG. 2.

FIG. 4 shows an airplane wing and an aileron or flap, the shell of the wing being made up of two panel units with a spar and stringer in juxtaposition on them at the shell parting line, and with a number of stringers in opposition on them apart from the parting line, all interlocked by identical mortised keys; the structure of the aileron or flap is analogous to that of FIG. 1 with two spars and stringers keyed in juxtaposition thereto.

FIG. 5 is a profile view of a wing and an aileron or flap in which the wing body is constituted of two panel units and of a framework of spars and bulkheads, the panel units being united with each other as well as with the framework by means of linear mortised keys telescoped into complementally matching tenoned sockets on the panel units and on the spars; a segmental tenoned socket, or a spar embodying such a socket is key-locked in a cluster of other such sockets and carries the aileron or flap pivotally in the manner of the spar of FIG. 2.

FIG. 6 is an airplane wing and an aileron or flap, one of the panel units in the wing shell including chordal bulkheads and stringers extending spanwise thereon in alinement with a spar and stringers on the other panel unit and locked to each other by linear keys; the construction of the aileron or flap is analogous to that of the wing; and FIG. 7 is a plan view of the wing of FIG. 6 showing the location of the bulkheads and stringers therein as well as in the aileron and in the flap hinged onto the bulkheads.

The wing or control surface structure of FIG. 1 possesses certain basic features and includes certain components that distinguish all of the embodiments shown in the drawing; it comprises a shell assembled of two panel units, of which unit 1 provides one whole side and both profile extremities of the shell as well as portions of the opposite side proximate to these extremities; another panel unit, 2, meets the first panel unit 1 at two parting lines 3 and 4, and between them provides the remaining central portion of the other shell side. Both of the panel units include spanwise stress members as their integral components, which members not only support the shell but are made use of also to hold the panels forming it relatively immovably both face-to-face and edge-to-edge at the parting lines 3 and 4; because of these vital functions, these stress members at the parting lines are refererd to herein as the principal ones; other stress members supporting the shell and holding its panels together face-to-face may be used intermediate the principal ones.

In this instance, the principal stress members are of substantially the same profile at both locations although of unequal size, and include members 5 and 6 attached to both of the opposite inner sides of the same panel unit 1 by a base 8 and a flange 7, and having each a transverse web 9 intervening between them; this profile is devised to cause these stress members to function as spars; additionally, each one of them is formed on its web 9 and on its flanges 7 and base 8 with portions of a longitudinal segmental socket which extends at and along the parting line, and has marginal half-tenons 10 at the limits of its segmental span, and intermediate them a number of angularly equidistant tenons 11 running lengthwise on it.

The detachable panel unit 2 carries on it two stress members in the form of stringers 12 and 13 at and along the parting lines 3 and 4; each stringer has an attaching flange 14, and on it an arcuate wall 15 the concave side of which has marginal half-tenons 10a and intermediate tenons 11a running lengthwise on it and providing a segmental socket. When the panel unit 2 is in its place, as shown by dot-and-dash lines, the spars and the stringers 5—12 and 6—13 complement one another so that their sockets fall into coaxial alinement with each other, and the half-tenons 10—10a on them combine to form full equivalents of the tenons 11 and 11a in a complete circular series of them; into engagement with these combined sockets are slid endwise linear keys 16 and 17, respectively, the periphery of which is mortised lengthwise; the key mortises interfit slidably with the socket tenons and with each two half-tenons, and by a size-to-size engagement at the mortise and tenon sides the sockets and their respective spars, stringers, and panel units are locked together relatively immovably; for this locking function the socket tenons and the key mortises are provided preferably with flat reentrant flanks such as characterize the "dovetail" shape shown, the slidable contact and engagement taking place at the flanks. The dividing plane at which the segmental sockets of spars and stringers engage the keys 16 and 17 has a generally transverse direction across the airfoil shell, i.e., either normal or diagonal to it, or has a combination of both such directions, as shown; the results of this transverse division are that the panels constituting the shell cohere edge-to-edge and in flush alinement with each other at the parting lines because of the engagement of the keys with their half-tenons 10—10a thereat; moreover, the stringers 12 and 13 complement their respective spars 5 and 6 and jointly with them and with the keys function as unitary stress members.

The dovetail profile of the key mortises and of the socket tenons 11 and 11a is particularly useful because it makes it possible to form these parts with a large section modulus yet thin walls for strength and light weight; this is accomplished by employing shallow mortises for the key and corresponding tenons of low height for the sockets, the depth of the mortises being approximately equal to or smaller than their width, the preferred depth being only about one half of their width; with such proportions the tenons on the spar and stringer as well as those on the key between the mortises therein will be subject to tension and shear stresses rather than to bending and thereby afford the necessary strength with a minimum of weight; one of the reasons for that is that the keys can have holes through them only a little smaller than their overall size and even small keys can be made hollow.

In the wing structure of FIG. 2, the components of which are shown separated in FIG. 3, one panel unit 18 provides the air penetrating closed chordal extremity, one whole side, and a portion of the opposite side of the shell up to a parting line 19 remote from that extremity; another panel unit 20 provides a continuation of the shell from the parting line 19 to an open trailing extremity, the extremity itself being occupied by an aileron or flap. The panel units are held in unity by keylocked stress members integral with them, i.e., either made in one piece with them or permanently attached to them; the stress members include a spar 21 and a stringer 22 in juxtaposition to each other at a transverse plane at and along the parting line 19, and stringers 23—24 on the respective panel units and extending in opposition to each other at and along the aft shell open extremity.

The spar 21 is attached to the opposite sides of the panel unit 18 by flanges 25, and transverse webs 26 connecting them support a longitudinal segmental socket which consists of a 180 degree arcuate web 27 astride a plane through the parting line 19, and of marginal half-tenons and full tenons on it. As a mate to the spar 21, the stringer 22 carries a similar segmental socket on a web 27a remote from an attaching flange 28 and complemental to the socket on the spar 21; in coaxial alinement, these sockets abut with each other at marginal half-tenons at a transverse dividing plane, and a mortised key 29 telescoped into them locks the panel units to each other as well as causes the spar and the stringer to coact with it and with each other as a unitary stress member.

The aft stringers 23 and 24 are both of a substantially identical profile and are attached to the respective panel units by flanges 30, on which they have walls which support arcuate webs 31 and 32, respectively; marginal half-tenons and intermediate tenons on these webs constitute jointly longitudinal segmental sockets; the angular span and the location of these sockets are such that in coaxial alinement their inward half-tenons abut each other at a central dividing plane, while their outward ones are parted divergently, and the sockets are interlocked in that relationship by a mortised key 33.

The arc between the divergent half-tenons on the sockets 31—32 is occupied by a longitudinal tenoned socket 34 which is in engagement with the remaining sector of the key 33 and abuts and complements the stringers with its marginal convergent half-tenons; the socket 34 may be of either a limited or of a continuous spanwise extent, and in the latter case represents a spar which coacts with the stringers 23—24 and with the key 33 as a unitary stress member; attached at spanwise intervals to the spar 34 are brackets 35 which project rearwardly and mount pivotally an aileron or flap; the forces on this aileron or flap are communicated to the brackets 35 and are taken up by spar 34, from which they are transferred into the key 33 and into the stringers 23—24 as the aft principal supporting members in the wing.

In supporting the wing as well as its aileron or flap, the stringers 23—24 and the spar and stringer 21—22, and the respective keys 29 and 33 therein, have all the forces acting upon the wing shell transferred into them by chordal ribs or bulkheads 36 and 37, which are part of the respective panel units 18 and 20 and abut the spar and stringer walls; these ribs not only maintain the shape of the shell against air pressure upon it, but also maintain the relative position of the spar and stringer 21—22 with the stringers 23—24 and thereby cause the fore members to coact with the aft ones for jointly sustaining all forces on the wing and its aileron and flap.

The structure of the aileron or flap hinged to the wing of FIGS. 2 and 3 embodies the same principles of shell division and its support by interlocked stress members as disclosed in the foregoing two structures; its shell consists of two panel units 38—39, of which the former one forms the whole dorsal side and one of its closed chordal extremities—the aft one in this case—and provides a portion of the central side whereat it meets the panel unit 39 at a parting line 40 which is distanced from both chordal extremities of the shell; the latter panel unit completes the ventral side to the fore chordal extremity.

The principal stress members in this shell are a spar 41 and a stringer 42, both attached to their respective panel units in juxtaposition to each other at and along the parting line 40, the spar being attached to both inner sides of the panel unit 38; both the spar and the stringer carry coaxial segmental tenoned sockets which encompass and interfit with two sectors of a linear mortised key 43; these sectors adjoin each other on the aft key side and are parted divergently on the fore side; the sector between them on the fore side is occupied by a segmental socket 44 which constitutes a spar analogous to the spar 34 in the wing, and is in a slidable engagement with the key 43; brackets 45 project from the spar forwardly and are connected pivotally with the brackets 35 on the wing spar 34.

Substantially the same construction of the shell as in the preceding wing characterizes the one in FIG. 4; one panel unit 46 forms the larger part of the shell which has a parting line 47 remote from its chordal extremity, and is complemented by a detachable side portion provided by a panel unit 48; the principal stress members again include a spar 49 attached by flanges 50 and 51 to the opposite sides of the closed panel unit 46, and a stringer 52 attached by a flange 53 to the panel unit 48 at and along the parting line 47 in juxtaposition to the spar; the stringer and the spar bear longitudinal coaxially alined segmental sockets which are in cojoint engagement, through a complete series of tenons on them, of a mortised key 54 at a dividing plane transverse to the shell.

At and along the aft open chordal extremity of the shell extend stringers 55–56 in frontal opposition with each other on the respective panel units 46 and 48, and represent principal stress members analogous to those in the same location in the preceding embodiments; these stringers have spaced dual side walls supporting longitudinal segmental sockets in coaxial alinement with each other and in a mortise-and-tenon engagement with a linear mortised key 54b; the dividing plane between the sockets is substantially horizontal and is located closer to the dorsal side of the shell whereby the stringers are of unequal height, the objective being to place the key and the sockets close to that side because compressive stresses prevail in it.

Intermediate the above disclosed principal stress members in this shell structure is positioned another pair of opposedly alined stringers 57—58, of the same type as the aft ones 55—56, and interlocked in the same manner by a key 54a; in this union, the stringers in each pair as well as in all the other pairs of stringers and in the union of spars with stringers hereinabove disclosed, the key constrains them relatively immovably and thereby all the members of such a union coact with one another in resisting stresses and function as a unitary spar.

Chordwise between the stringers 52, 57 and 55 and integrally connected with them and with the panel unit 48 extend ribs or bulkheads 59 and 60 which buttress the stringers and transfer shear loads on the shell to and into them; the stringers and the bulkheads thus form a unitary framework of stress members which, in this embodiment, is fabricated with full accessibility as an integral component of one of the panel units.

The construction of the aileron or flap in the wing of FIG. 4 is the same as that of the airfoil in FIG. 1; a panel unit 61 provides both closed chordal extremities as well as one shell side, while another panel unit 62 provides the remaining side portion between two spanwise parting lines 63 and 64, both remote from the shell chordal extremities; spars 65 and 66 attached to the opposite inner sides of the closed panel unit 61 at and along the parting lines, and stringers 67 and 68 extending on the panel unit 62 in juxtaposition to the respective spars are dovetailed jointly with them onto linear mortised keys 69 and 69a at a transverse dividing plane; the spars and stringers so locked to each other function as the principal stress members similarly as their counterparts of FIG. 1.

In the wing of FIG. 5, spanwise and chordwise stress members form a framework which is analogous to the one in the wing of FIG. 4 except in that it constitutes a sub-assembly fabricated independently of the panel units, and is integrated into the shell structure by means of the same keys that hold the panel units together; a panel unit 70 again forms the dorsal side rearwardly as well as forwardly of the maximum camber of the airfoil, and forms the fore closed profile extremity and the fore portion of the ventral side to its termination at a spanwise edge and parting line 71 remote from that extremity; a panel unit 72 complements it in flush continuity aft from the parting line.

Both of the panel units 70 and 72 have integral stress members on them at the shell chordal extremities, as represented by a spar 73 and a stringer 74 in juxtaposition to it, bearing respective segmental tenoned sockets 75 and 76 at a transverse dividing plane at the parting line 71; the combined segments of these sockets leave a vacant arc of about 90 degrees between them on the aft side of their union; at and along the other chordal extremity of the air foil extend stringers 77 and 78 in opposition to each other and having quadrantal sockets thereon coaxially alined with each other so that they leave unoccupied arcs between them on both the fore and the aft side of their segments.

Interjacent the two panel units and the principal stress members on them is included a framework of spars and bulkheads and is secured demountably to both of the panel units instead of only to one of them as in FIG. 4; the framework consists of a central vertical spar 119 which has the profile of an I-beam, and of a fore spar 80 and an aft spar 81, both of which are channel sections laid horizontally; abutting the central spar and straddled at their ends by the two channel spars are chordal bulkheads or ribs 82 and 83, respectively; the spars function also as the carriers of means for interlocking them and the whole framework with the panel units; the spar 119 has as parts of its profile upper and lower flanged caps 79 which embody longitudinal segmental tenoned sockets 84 and 85, respectively; alined coaxially with these sockets are identical ones in stringers 86 and 87 which are provided on the respective panel units 70 and 72; the channel spars 80 and 81 have respective segmental tenoned sockets 88 and 89 extending on them complementally to the divergent arcs between the principal member sockets and coaxial with them; into all such coaxially alined sockets are telescoped linear mortised keys 90 to unite relatively immovably the components bearing them.

Included in the cluster of the sockets around the aft key 90a is a fourth socket which is part of a spar 91; this spar has convergent walls astride the socket thereof and on the obverse side of its walls is in contiguity with the divergently parted stringer walls, and on the reverse side of its walls bears brackets such as 92 for mounting pivotally an aileron or flap at spanwise stations which are substantially coincident with the location of the bulkheads 83.

The structure of this aileron or flap is shown as being of a type in which two panel units 93 and 94 meet at spanwise parting lines on the opposite shell sides and are held in unity by respective spars 95 and 96; segmental tenoned sockets carried by these spars are coaxially alined with each other at a transverse dividing plane, and by being dovetailed onto a linear mortised key 97 draw the panel units together edge-to-edge at the parting lines.

A wing and aileron structure in which through chordwise bulkheads are employed as part of one of the panel units, similarly as the divided ones in the framework of stress members of FIG. 4, is shown in profile in FIG. 6 and in plan view in FIG. 7; one panel unit, 98, of the two that constitute the airfoil shell and provide the supporting members therein, is analogous to the panel unit 46 of FIG. 4 in the matter of its extent and types of the spar and stringers in it; a spar 99 connects the opposite shell sides at the parting line 100; a stringer 101c extends at and along the aft open extremity of the shell, and a number of stringers 101a and 101b extend intermediate the spar 99 and the aft stringer 101c on the side of the panel unit 98, all of them having a substantially identical profile. The complemental panel unit 102 includes a number of chordal bulkheads 103a–103d stationed at spanwise intervals; these bulkheads run from the fore edge of the panel unit at the parting line 100 to its aft edge and beyond it form hinge brackets 117 on which are mounted pivotally an aileron 104 and a flap 105; the bulkheads 103 have a flanged cross-section the top flange of which follows at a substantially uniform distance from the dorsal panel unit; secured to the fore ends of the bulkheads and to the panel unit 102 at and along the parting line 100 is a stringer 106 in juxtaposition to the spar 99 on the panel unit 98, the stringer and the spar bearing coaxial tenoned sockets at a plane transverse to the airfoil; at chordal intervals from the stringer 106 crossing the bulkheads 103 on their top flange is a number of stringers 107a–107c which bear segmental tenoned sockets coaxially with like sockets in the stringers 101a–101c on the panel unit 98; into all such coaxially alined sockets are telescoped linear mortised keys 118. The bulkheads 103a–103d and the stringers 106 and 107a–107c constitute a framework of stress members fabricated as a sub-assembly with the panel unit 99 and coacting with the stress members on the panel unit 98 in bracing and supporting the shell.

The same construction as that of the wing body is applied to the aileron 104 and to the flap 105, and includes two panel units 108 and 109 which jointly form an airfoil shell and its supporting structure; the panel unit 108 is continuous around the shell trailing extremity, and the companion unit 109 meets it at a spanwise parting line 110 remote from that extremity, and forms the remainder of the shell; chordwise on the panel unit 109 extend ribs or bulkheads 111 which are analogous to the bulkheads 103 in the wing body and are pivotally suspended on them; the principal stress members consist of a spar 112 and a stringer 113 in juxtaposition to each other at the parting line 110 at a transverse plane thereat, and of stringers 114 and 115 in frontal opposition to each other apart from the parting line on the respective panel units, and bearing segmental tenoned sockets coaxially with each other; the stringers 113 and 115 are carried on the bulkheads 111 and jointly with them constitute a unitary framework of stress members; mortised keys 116 and 116a lock the panel units into a complete airfoil body.

I claim:

1. In a structure, two panels forming each a part of an airfoil shell in facing positions of each other, stringers extending one on each of said panels in spanwise opposed alinement with each other, said stringers bearing longitudinal segmental tenoned sockets alined coaxially with each other, a longitudinally mortised linear key telescoped into engagement with said sockets, said stringer sockets being parted angularly from one another on one lateral side of said stringers, and a spar having a longitudinal segmental tenoned socket thereon alined coaxially with and complementally to said parted stringer sockets and in engagement with said key therein.

2. In a structure, components and their relationship as set forth in claim 1, said stringers having walls between the respective panels and sockets thereof, said walls being parted divergently from one another on one lateral side of said stringers, and said spar having convergent walls astride said socket thereof and being in contiguity of said walls with said stringer walls.

3. In a structure, two panels forming each a part of an airfoil shell in facing positions of each other, stringers extending one on each of said panels in spanwise opposed alinement with each other, said stringers bearing longitudinal segmental tenoned sockets coaxially with each other, a longitudinally mortised linear key telescoped into engagement with said sockets, said stringer sockets being parted angularly from each other on both lateral sides of said stringers, and two spars coextensive each with said stringers on one of said sides thereof, each of said spars having a longitudinal segmental tenoned socket thereon coaxially with and complementally to said parted stringer sockets and in engagement with said key therein.

4. In a structure, components and their relationships as set forth in claim 3, chordal bulkheads attached at spanwise stations to one of said spars, and hinge brackets attached to the other one of said spars at substantially the same stations as said bulkheads.

5. In an airfoil structure, a panel continuous over one side of the airfoil and around one chordal extremity thereof to the other side and terminating with a spanwise edge distantly from said extremity, another panel in coplanar continuity with said first panel at said edge, a spar extending in said airfoil at and along said panel edge, said spar having a web intervening between and attached to the opposite inner faces of said first panel, a stringer extending on said other panel in juxtaposition to said spar, said spar and said stringer bearing longitudinal segmental tenoned sockets coaxially with each other, said sockets spanning segments divided by a plane transverse to said airfoil, and a linear mortised key in a slidable engagement with said coaxial sockets.

6. In a structure, two panels forming jointly an airfoil shell, one of said panels being continuous around a closed profile extremity of said shell and meeting the other panel at a spanwise parting line distant from said extremity, three stress members extending spanwise in said shell, one of said stress members being a spar and having a web intervening between and attached to the opposite faces of said closed extremity panel at and along said parting line, the second one of said stress members being a stringer extending on and attached to the other one of said panels in juxtaposition to said spar, the third one of said stress members being another spar coextensive with said first spar and with said stringer and carrying chordal members thereon, said spars and said stringer bearing longitudinal segmental tenoned sockets coaxially with one another, the dividing plane between the segments occupied by said first spar and said stringer sockets being substantially transverse of said airfoil, and a linear longitudinally mortised key in a slidable engagement with said coaxial sockets.

7. In a structure, two panels forming each one of the opposite sides in a shell of an elongated profile, stringers spaced apart from each other extending lengthwise on one of said panels, stress members extending on the other one of said panels in paired relationship with said first panel stringers, said paired stringers and stress members bearing longitudinal segmental tenoned sockets coaxially with each other, linear longitudinally mortised keys telescoped into said coaxial sockets to lock said stringers and stress members together relatively immovably, and bulkheads extending at lengthwise intervals between said stringers, said bulkheads abutting said stringers and being attached thereto and to said panel thereof for transferring stresses from said panel into said stringers and into said stress members coacting therewith through said keys as unitary spars for said shell.

8. In a structure, two panel units forming each one of the opposite sides and one closed profile extremity of a shell of an elongated profile and meeting each other in edge-to-edge continuity at two lengthwise parting lines located remotely from the shell profile extremities, two stress members integral each with one of said panels extending in juxtaposition to each other in said shell at and along each of said parting lines therein, said stress members bearing longitudinal segmental tenoned sockets coaxial with each other at a dividing plane transverse to said shell, linear longitudinally mortised keys telescoped one into each two of said coaxial sockets to lock said stress members together relatively immovably and thereby hold said panels in said continuity thereof at each parting line, one of said stress members at each parting line being integral with and intervening between the opposite faces of the panel thereof to hold said shell sides together face-to-face.

9. In a structure, two panel units forming jointly an airfoil shell, spanwise stringers extending at chordal intervals on each of said panel units as integral parts thereof, said stringers on both of said panel units being in paired relationship with each other and bearing longitudinal segmental tenoned sockets coaxially with each other, linear longitudinally mortised keys telescoped one into each two of said coaxial sockets to lock said stringers together relatively immovably as a unitary stress member, chordal ribs extending at spanwise stations between said stringers on at least one of said panel units, hinge brackets located at one profie extremity of said shell at substantially the same stations as certain of said ribs, and means for cojoining said brackets with and supporting them by said panel unit stringers and ribs through the instrumentality of two of said paired stringers at said profile extremity and one of said keys therein.

10. In a structure, components and their relationships as set forth in claim 9, said means for cojoining said brackets with said panel unit stringers and ribs residing in said coaxial sockets on said paired stringers at said shell extremity being parted divergently from each other on the side of said brackets, a segmental tenoned socket at each bracket occupying the segment between said parted sockets coaxially therewith and in engagement with said mortised key therein, said brackets being attached each to and supported by said segment occupying socket thereat.

11. In a structure, two panel units forming jointly an airfoil shell, chordal bulkheads extending at spanwise intervals on at least one of said panel units as integral parts thereof, spanwise stringers extending at chordal intervals on each of said panel units as integral parts thereof, said bulkheads having a flanged cross-section and bearing said stringers of said one panel unit thereon, certain of said bulkheads projecting beyond the last one of said stringers into one air foil profile extremity and terminating as hinge brackets therein, said stringers on both of said panel units being in a paired relationship with each other and bearing longitudinal segmental tenoned sockets coaxially with each other, and linear longitudinally mortised keys telescoped one into each of said coaxial sockets to lock said paired stringers together relatively immovably as unitary stress members for said shell and brackets.

12. In a structure, two panel units forming jointly an airfoil shell, one of said panel units forming one side and a closed profile extremity of said shell and meeting the other panel unit at a spanwise parting line located distantly from said shell closed extremity, a spar intervening between and attached to the opposite inner faces of said closed extremity panel unit at and along said parting line, a stringer extending on the other one of said panel units in juxtaposition to said spar, two stringers extending one on each of said panel units in spanwise opposition to each other at and along the shell other profile extremity, chordal ribs extending at spanwise stations between said spar and stringer on said first panel unit and between said stringer in juxtaposition and said stringer in opposition on said other panel unit, said spar and stringer in juxtaposition and said two stringers in opposition bearing longitudinal segmental tenoned sockets coaxially with one another, and linear longitudinally mortised keys telescoped one into each two of said coaxial sockets.

13. In a structure, components and their relationships as set forth in claim 12, said coaxial sockets borne on said stringers in opposition being parted from each other divergently at said other shell profile extremity, a spar bearing a longitudinal segmental tenoned socket complemental to and coaxial with said divergently parted opposed stringer sockets and in engagement with said one key therein, and hinge brackets carried on said spar in said other shell profile extremity at substantially the same stations as certain of said ribs on said panel units.

14. In a structure, two panel units forming jointly an airfoil shell and providing supporting stress members therefor, said panel units meeting each other at a spanwise parting line located distantly from a closed profile extremity of said shell, two of said stress members extending one on each of said panel units in juxtaposition to each other at and along said parting line therein, two of said stress members extending one on each of said panel units in opposition to each other at and along the other shell profile extremity, said stress members in juxtaposition and in opposition bearing longitudinal segmental tenoned sockets coaxially with each other, longitudinally mortised linear keys telescoped one into each two of said coaxial sockets, a framework of spanwise and chordwise stress members included between said stress members in juxtaposition and in opposition, and means for attaching said framework demountably to at least one of said panel units through said said spanwise stress members in said framework and by means of said mortised keys in said stress members in juxtaposition and in opposition.

15. In a structure, components and their relationships as set forth in claim 14, hinge brackets stationed at said other shell profile extremity at locations substantially those of certain of said chordwise stress members in said framework, and means for attaching said brackets demountably to at least one of said panel units through the instrumentality of said stress members in opposition and said one mortised key therein.

16. In a structure, components and their relationships as set forth in claim 14, said framework of spanwise and chordwise stress members being an integral part of one of said panel units, one of said stress members in juxtaposition and one of said members in opposition providing the respective fore and aft spanwise stress members in said framework, one or more of spanwise stress members forming a part of said framework intermediate said fore and aft members, stress members extending on the other one of said panel units in opposition to each of said intermediate framework members, each intermediate framework member and said panel unit stress member in opposition thereto bearing longitudinal segmental tenoned sockets coaxially with each other, and a longitudinally mortised linear key telescoped into each two of said coaxial sockets.

17. In a structure, components and their relationships as set forth in claim 14, said framework being attached demountably to both of said panel units, said means for attaching said framework to said panel units including one fore and one aft spanwise stress member in said framework, said fore and aft members carrying longitudinal segmental tenoned sockets coaxially with said respective sockets on said stress members in juxtaposition and in opposition on said panel units and in cojoint engagement of said mortised keys therein.

18. In a structure, two panel units forming jointly an airfoil shell, one of said panel units forming a closed profile extremity of said shell and meeting the other panel unit at a spanwise parting line located distantly from said shell closed extremity, a spar intervening between and attached to the opposite inner faces of said closed extremity panel unit at and along said parting line, a stringer extending on said other panel unit in juxtaposition to said spar, two stringers extending one on each of said panel units in spanwise opposed alinement with each other at the shell other profile extremity, two other stringers extending one on each of said panel units in spanwise opposed alinement with each other intermediate said closed extremity and said other extremity of said shell, chordal bulkheads at spanwise stations abutting said stringer in juxtaposition and one of each two of said opposed stringers and forming a framework therewith and being attached to the panel unit thereof, said spar and stringer in juxtaposition and each two of said opposed stringers bearing longitudinal segmental tenoned sockets coaxially with each other, and longitudinally mortised linear keys telescoped one into each two of said coaxial sockets.

19. In a structure, two panel units forming jointly an airfoil shell, one of said panel units forming a closed profile extremity of said shell and meeting the other panel unit at a spanwise parting line located distantly from said shell closed extremity, a spar intervening between and attached to the opposite inner faces of said closed extremity panel unit at and along said parting line, a stringer extending on said other panel unit in juxtaposition to said spar, two stringers extending one on each of said panel units in spanwise opposed alinement with each other at the shell other profile extremity, two spars coextensive one with said spar and stringer in juxtaposition on the lateral side thereof away from said shell closed extremity and the other one with said opposed stringers on the lateral side thereof away from said shell other extremity, chordal bulkheads connecting said two lateral spars and forming a framework therewith, said spar and stringer in juxtaposition and said lateral spar coextensive therewith and said opposed stringers and said lateral spar coextensive therewith bearing longitudinal segmental tenoned sockets coaxially with each other, and longitudinally mortised linear keys telescoped one into each three of said coaxial sockets.

20. In a structure, components and their relationships as set forth in claim 19, spanwise caps extending intermediate said framework lateral spars and being attached to the top and bottom sides of said framework bulkheads at crossings therewith, and stringers extending on each of said panel units in opposed alinement with said caps, said caps and stringers in alinement bearing longitudinal segmental tenoned sockets coaxially with each other, one of said linear keys being telescoped into each two of said coaxial sockets.

21. In a structure, components and their relationships as set forth in claim 19, a third spar in said framework intermediate said lateral spars and interposed spanwise between fore and aft portions of said bulkheads therein, said spar having top and bottom caps thereon, and stringers extending one on each of said panel units in opposed alinement with said spar caps, said spar caps and said tenoned sockets coaxially with each other, one of said stringers in alinement bearing longitudinal segmental linear keys being telescoped into each two of said coaxial sockets.

22. In a structure, two panel units forming jointly an airfoil shell, one of said panel units forming a closed profile extremity of said shell and meeting the other panel unit at a spanwise parting line located distantly from said shell closed extremity, a spar intervening between attached to the opposite inner faces of said closed extremity panel unit at and along said parting line, a stringer extending on said other panel unit in juxtaposition to said spar, chordal bulkheads at spanwise stations in said shell, said bulkheads abutting said stringer and therefrom extending to the shell other extremity and being integral with the inner face of said other panel unit and having a flange following to a spaced relationship the inner face of said closed extremity panel unit, a number of spanwise stringers in paired opposed alinement with each other extending at chordwise intervals in the space between said bulkheads and said closed extremity panel unit in the extent of said space from said spar and stringer in juxtaposition to said other shell extremity, one stringer in each pair extending on said closed extremity panel unit and the other one on said bulkhead flange at the crossing therewith, said spar and stringer in juxtaposition and said stringers in opposition in each pair bearing longitudinal segmental tenoned sockets coaxially with each other, and longitudinally mortised linear keys telescoped one into each two of said coaxial sockets.

23. In a structure, two panel units forming portions of a shell of an elongated profile, one of said panel units forming one side and a closed profile extremity of said shell and meeting the other panel unit on the other side at a lengthwise parting line located distantly from said extremity, a spar intervening between the opposite inner sides of said closed extremity panel unit at and along said parting line, a stringer extending on the other panel unit in juxtaposition to said spar, two stringers extending one on each of said panel units in opposed alinement with each other at the other shell profile extremity, segmental tenoned sockets borne coaxially with each other as parts of said spar and stringer in juxtaposition and of said two opposed stringers, and linear mortised keys telescoped into engagement one with each two of said coaxially borne sockets.

24. In a structure, components and their relationships as set forth in claim 23, said segmental sockets borne on said opposed stringers being parted from each other on the side of the shell other profile extremity, a segmental tenoned socket complementing said parted stringer sockets and being in engagement jointly therewith of said one key therein, and a hinge bracket mounted on said socket and therefrom projecting toward said shell other extremity.

25. In a structure, two panel units forming jointly a shell of an elongated profile and meeting with each other at a lengthwise parting line located distantly from one shell profile extremity, a framework of lengthwise and chordwise stress members on at least one of said panel units integral therewith, lengthwise stress members integral with the other panel unit, one of said lengthwise members of each panel unit extending at and along said parting line, other lengthwise members of both panel units extending in alinement with each other apart from said parting line, segmental tenoned sockets borne on said lengthwise members of both panel units coaxially with each other, and linear mortised keys telescoped one into each two of said coaxially borne sockets for interlocking said lengthwise members of both panel units into unitary spars in said framework thereof.

No references cited.